T. J. Price,
Washing Machine.
Nº 18,518.  Patented Oct. 27, 1857.
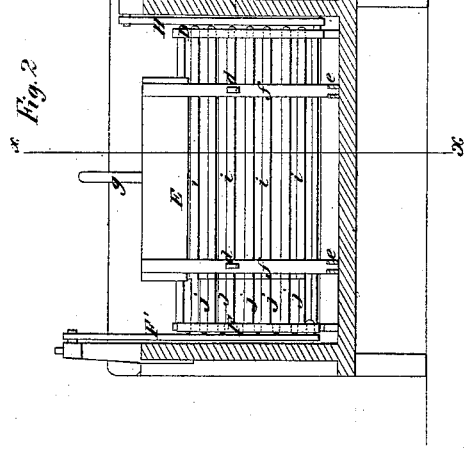
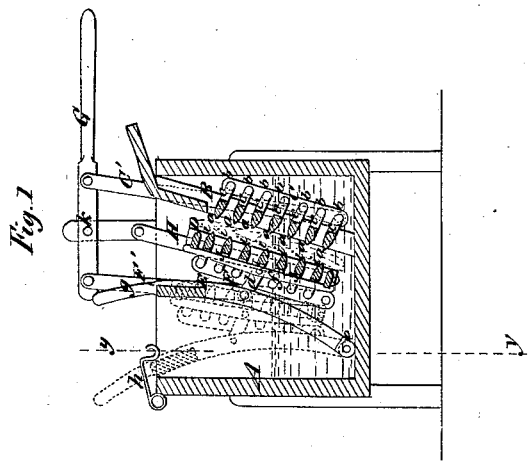

UNITED STATES PATENT OFFICE.

THOMAS J. PRICE, OF INDUSTRY, ILLINOIS.

WASHING-MACHINE.

Specification of Letters Patent No. 18,518, dated October 27, 1857.

*To all whom it may concern:*

Be it known that I, THOMAS J. PRICE, of Industry, in the county of McDonough and State of Illinois, have invented a new and Improved Clothes-Washing Machine; and I do hereby declare that the following is a full, clear, and exact description of the same, reference being had to the annexed drawings, making a part of this specification, in which—

Figure 1 is a vertical section of my improvement taken in the line x, x, Fig. 2. Fig. 2 is also a vertical section of ditto taken in the line y, y, Fig. 1, the planes of section of the two figures crossing each other at right angles.

Similar letters of reference indicate corresponding parts in the two figures.

My invention consists in having two frames, one stationary, and the other adjustable, placed or fitted within a suitable tub or box, and provided with horizontal vibrating slats arranged and operated as will be hereinafter fully shown and described, whereby the clothes are subjected to the necessary rubbing in order to thoroughly cleanse them, and still not liable to be torn or injured in any way by undue friction or rubbing.

To enable those skilled in the art to fully understand and construct my invention I will proceed to describe it.

A represents a rectangular box within which a frame B is placed. This frame is of rectangular form, is slightly inclined and is placed at one side of the box as shown clearly in Fig. 1. Within the frame B a series of horizontal slats a, are placed. These slats have tenons at their ends and they are allowed to turn or vibrate freely on their tenons similar to the slats of a window blind. The ends of the slats at one end of the frame B are pivoted to a bar C, the ends of the slats having tenons, b, formed on them which tenons are fitted in the bar C. The tenons, b, are formed at the edges of lateral projections c on the slats, a. See Fig. 1.

D is a rectangular frame which is attached by links, d, to a frame E, the lower end of which is pivoted as shown at, e, to the bottom of the box A. The frame D has bars, f, attached to its outer side into the centers of which one end of the links, d, are pivoted. The upper end of the frame E is provided with a handle g, and the upper end of said frame may when desired be secured to the side of the box A by a hook or catch, h, as shown in Fig. 1.

The frame D is provided with horizontal slats, i, which are fitted in said frame, precisely similar to the slats, a, in the frame B. The slats, i, having lateral projections, j, at one end, which projections are pivoted to a bar F. The upper ends of both bars C, F, are connected by bars C′, F′, to a lever G, the fulcrum, k, of which is placed between the upper ends of the bars C′, F′, as shown clearly in Fig. 1, and a bar H, is attached to the lower part of each side of the frame D, the upper ends of said bars being pivoted to the upper parts of the end pieces of the box A.

The operation is as follows: The upper end of the frame E, is secured back to the side of the box A by the hook, h, as shown in red Fig. 1, and the tub is supplied with the requisite quantity of suds. The clothes to be washed are placed between the slats, a, i, of the two frames B, D, and, when thoroughly immersed, the frame E is released by raising the catch or hook, h, and the frame D is allowed to rest or bear against the clothes and may if necessary be pressed against them by means of the left hand which grasps the handle, g. The lever G is operated by the right hand and the slats, a, i, of both frames will be vibrated in consequence of its connection with the slats as shown, and said slats will act upon the clothes subjecting them to the necessary rubbing and friction to cleanse them thoroughly without tearing or injuring them. The object is attained in consequence of the limited movement of the vibrating slats. In the machines hitherto constructed the clothes are acted upon by reciprocating rubbers which have a considerable length of movement, and if an article of clothing catches in said rubbers it is liable to be torn. In my improvement if an article of clothing should catch into either of the slats, the length of the vibration or movement of the slats is so very slight or small that any portion of the clothes will yield or give sufficiently to prevent the tearing of the same.

Having thus described my invention, what I claim as new and desire to secure by Letters Patent, is—

The stationary frame B and adjustable frame D, placed within the box A, and provided with vibrating slats, $a$, $i$, operated substantially as shown for the purpose specified.

THOMAS J. PRICE.

Witnesses:
W. R. DOWNEN,
JOHN REED.